(12) United States Patent
Kushner et al.

(10) Patent No.: US 7,155,388 B2
(45) Date of Patent: Dec. 26, 2006

(54) METHOD AND APPARATUS FOR CHARACTERIZING INHALATION NOISE AND CALCULATING PARAMETERS BASED ON THE CHARACTERIZATION

(75) Inventors: William M. Kushner, Arlington Heights, IL (US); Sara M. Harton, Oak Park, IL (US); Mark A. Jasiuk, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/882,715

(22) Filed: Jun. 30, 2004

(65) Prior Publication Data

US 2006/0009971 A1    Jan. 12, 2006

(51) Int. Cl.
G10L 15/20 (2006.01)
G10L 11/00 (2006.01)
A61M 16/00 (2006.01)

(52) U.S. Cl. .................. 704/233; 704/270; 128/200.24
(58) Field of Classification Search ................ 704/231, 704/257; 128/653, 701
See application file for complete search history.

(56) References Cited

U.S. PATENT DOCUMENTS

| | | | |
|---|---|---|---|
| 3,347,229 A | 10/1967 | Heitman | |
| 3,415,245 A | 12/1968 | Yamamato et al. | |
| 3,850,168 A | 11/1974 | Ferguson et al. | |
| 4,154,981 A | 5/1979 | Dewberry et al. | |
| 4,376,916 A | 3/1983 | Glaberson | |
| 4,720,802 A | 1/1988 | Damoulakis et al. | |
| 4,799,263 A | 1/1989 | Banziger et al. | |
| 4,862,503 A | 8/1989 | Rothenberg | |
| 4,958,638 A * | 9/1990 | Sharpe et al. ............... 600/407 |
| 5,143,078 A | 9/1992 | Mather et al. | |
| 5,222,190 A * | 6/1993 | Pawate et al. ............... 704/200 |
| 5,307,793 A | 5/1994 | Sinclair et al. | |
| 5,444,786 A * | 8/1995 | Raviv ....................... 381/71.14 |
| 5,579,284 A | 11/1996 | May | |
| 5,606,145 A | 2/1997 | Kim | |
| 5,727,074 A | 3/1998 | Hildebrand | |
| 5,730,140 A * | 3/1998 | Fitch ........................... 600/514 |
| 5,734,090 A | 3/1998 | Koppel et al. | |
| 5,768,398 A | 6/1998 | Janse et al. | |
| 5,822,386 A | 10/1998 | Pawelski | |
| 5,829,431 A | 11/1998 | Hannah et al. | |
| 5,890,111 A | 3/1999 | Javkin | |
| 5,905,971 A * | 5/1999 | Hovell ........................ 704/257 |

(Continued)

FOREIGN PATENT DOCUMENTS

WO    WO 9703723    2/1997

OTHER PUBLICATIONS

Quatieri, T. (2002). Discrete-time speech signal processing. Upper Saddle River, NJ: Prentice Hall PTR.*

(Continued)

Primary Examiner—David Hudspeth
Assistant Examiner—Brian L. Albertalli
(74) Attorney, Agent, or Firm—Valerie M. Davis

(57) ABSTRACT

A method for characterizing inhalation noise within a pressurized air delivery system, the method including the steps of: generating an inhalation noise model (912, 1012) based on inhalation noise; receiving an input signal (802) that includes inhalation noise comprising at least one inhalation noise burst; comparing (810) the input signal to the noise model to obtain a similarity measure; comparing the similarity measure to at least one threshold (832, 834) to detect the at least one inhalation noise burst; and characterizing (1354, 1356) the at least one detected inhalation noise burst.

17 Claims, 13 Drawing Sheets

U.S. PATENT DOCUMENTS

| | | | |
|---|---|---|---|
| 5,912,965 A * | 6/1999 | Boyer | 379/390.01 |
| 6,304,844 B1 * | 10/2001 | Pan et al. | 704/257 |
| 6,324,499 B1 * | 11/2001 | Lewis et al. | 704/233 |
| 6,470,315 B1 * | 10/2002 | Netsch et al. | 704/256.5 |
| 6,575,163 B1 | 6/2003 | Berthon-Jones | |
| 6,868,378 B1 | 3/2005 | Breton | |
| 6,892,175 B1 | 5/2005 | Cheng | |
| 2002/0018573 A1 | 2/2002 | Schwartz | |
| 2002/0086653 A1 | 7/2002 | Kim | |
| 2002/0116186 A1 | 8/2002 | Strauss et al. | |
| 2002/0168077 A1 | 11/2002 | Ootsu et al. | |
| 2002/0198704 A1 | 12/2002 | Rajan | |
| 2003/0062046 A1 | 4/2003 | Wiesmann et al. | |
| 2003/0163054 A1 | 8/2003 | Dekker | |

OTHER PUBLICATIONS

Steams, S., "Digital Signal Analysis", Rochelle Park, New Jersey, Hayden Book Company, Inc., pp. 233-237, Copyright 1975.

Lee, K., Reddy, R., "Automatic Speech Recognition", Norwell, MA, Kluwer Academic Publishers, pp. 17-26, Copyright 1989.

Roe, D., Wilpon, J., "Voice Communication Between Humans and Machines", Washington, D.C., National Academy Press, pp. 165-175, 1994.

A. Bruce Carlson, "Communications Systems: An Introduction to Signals and Noise in Electrical Communication", McGraw Hill, NY 1968, pp. 60-61.

Rabiner, Lawrence R., Schafer, Ronald W., "Digital Processing of Speech Signals", Prentice Hall, Inc., Englewood Cliffs, New Jersey, pp. 431-436.

Oppenheim, Alan V., Schafer, Ronald W., "Digital Signal Processing", Prentice Hall, Inc., Englewood Cliffs, New Jersey, pp. 345-353.

* cited by examiner

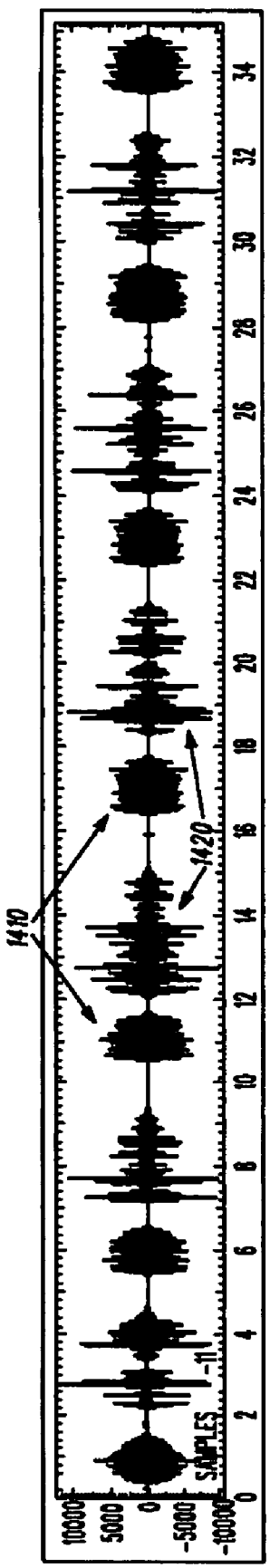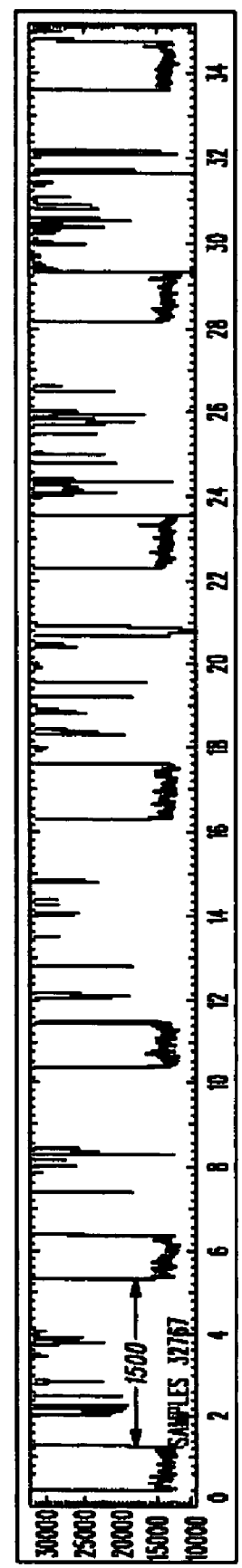

METHOD AND APPARATUS FOR CHARACTERIZING INHALATION NOISE AND CALCULATING PARAMETERS BASED ON THE CHARACTERIZATION

REFERENCE TO RELATED APPLICATIONS

The present invention is related to the following U.S. applications commonly owned together with this application by Motorola, Inc.:

Ser. No. 10/882,452, filed Jun. 30, 2004, titled "Method an Apparatus for Detecting and Attenuating Inhalation Noise in a Communication System" by Harton, et al.; and Ser. No. 10/882,450, filed Jun. 30, 2004, titled "Method an Apparatus for Equalizing a Speech Signal Generated within a Self-Contained Breathing Apparatus System" by Kushner, et al.

FIELD OF THE INVENTION

The present invention relates generally to a pressurized air delivery system coupled to a communication system.

BACKGROUND OF THE INVENTION

Good, reliable communications among personnel engaged in hazardous environmental activities, such as fire fighting, are essential for accomplishing their missions while maintaining their own health and safety. Working conditions may require the use of a pressurized air delivery system such as, for instance, a Self Contained Breathing Apparatus (SCBA) mask and air delivery system, a Self Contained Underwater Breathing Apparatus (SCUBA) mask and air delivery system, or an aircraft oxygen mask system. However, even while personnel are using such pressurized air delivery systems, it is desirable that good, reliable communications be maintained and personnel health and safety be effectively monitored.

FIG. 1 illustrates a simple block diagram of a prior art system 100 that includes a pressurized air delivery system 110 coupled to a communication system 130. The pressurized air delivery system typically includes: a breathing mask 112, such as a SCBA mask; an air cylinder (not shown); a regulator 118; and a high pressure hose 120 connecting the regulator 118 to the air cylinder. Depending upon the type of air delivery system 110 being used, the system 110 may provide protection to a user by, for example: providing the user with clean breathing air; keeping harmful toxins from reaching the user's lungs; protecting the user's lungs from being burned by superheated air inside of a burning structure; protecting the user's lungs from water; and providing protection to the user from facial and respiratory burns. Moreover, in general the mask is considered a pressure demand breathing system because air is typically only supplied when the mask wearer inhales.

Communication system 130 typically includes a conventional microphone 132 that is designed to record the speech of the mask wearer and that may be mounted inside the mask, outside and attached to the mask, or held in the hand over a voicemitter port on the mask 112. Communication system 130 further includes a communication unit 134 such as a two-way radio that the mask wearer can use to communicate her speech, for example, to other communication units. The mask microphone device 132 may be connected directly to the radio 134 or through an intermediary electronic processing device 138. This connection may be through a conventional wire cable (e.g., 136), or could be done wirelessly using a conventional RF, infrared, or ultrasonic short-range transmitter/receiver system. The intermediary electronic processing device 138 may be implemented, for instance, as a digital signal processor and may contain interface electronics, audio amplifiers, and battery power for the device and for the mask microphone.

There are some shortcomings associated with the use of systems such as system 100. These limitations will be described, for ease of illustration, by reference to the block diagram of FIG. 2, which illustrates the mask-to-radio audio path of system 100 illustrated in FIG. 1. Speech input 210 (e.g., $S_i(f)$) from the lips enters the mask (e.g. a SCBA mask), which has an acoustic transfer function 220 (e.g., $MSK(f)$) that is characterized by acoustic resonances and nulls. These resonances and nulls are due to the mask cavity volume and reflections of the sound from internal mask surfaces. These effects characterized by the transfer function $MSK(f)$ distort the input speech waveform $S_i(f)$ and alter its spectral content. Another sound source is noise 230 generated from the breathing equipment (e.g. regulator inhalation noise) that also enters the mask and is affected by $MSK(f)$. Another transfer function 240 (e.g., $NP_k(f)$) accounts for the fact that the noise is generated from a slightly different location in the mask than that of the speech. The speech and noise $S(f)$ are converted from acoustical energy to an electronic signal by a microphone which has its own transfer function 250 (e.g., $MIC(f)$). The microphone signal then typically passes through an audio amplifier and other circuitry, which also has a transfer function 260 (e.g., $MAA(f)$). An output signal 270 (e.g., $S_o(f)$) from $MAA(f)$ may then be input into a radio for further processing and transmission.

Returning to the shortcomings of systems such as system 100, an example of such a shortcoming relates to the generation by these systems of loud acoustic noises as part of their operation. More specifically, these noises can significantly degrade the quality of communications, especially when used with electronic systems such as radios. One such noise that is a prominent audio artifact introduced by a pressurized air delivery system, like a SCBA system, is regulator inhalation noise, which is illustrated in FIG. 2 as box 230.

The regulator inhalation noise occurs as a broadband noise burst occurring every time the mask wearer inhales. Negative pressure in the mask causes the air regulator valve to open, allowing high-pressure air to enter the mask and producing a loud hissing sound. This noise is picked up by the mask communications system microphone along with ensuing speech, and has about the same energy as the speech. The inhalation noise generally does not mask the speech since it typically occurs only upon inhalation. However, it can cause problems—examples of which are described as follows. For example, the inhalation noise can trigger VOX (voice-operated switch) circuits, thereby opening and occupying radio channels and potentially interfering with other speakers on the same radio channel. Moreover, in communication systems that use digital radios, the inhalation noise can trigger VAD (Voice Activity Detector) algorithms causing noise estimate confusion in noise suppression algorithms farther down the radio signal processing chain. In addition, the inhalation noise is, in general, annoying to a listener.

A second shortcoming of systems such as system 100 is described below. These systems use masks that typically encompass the nose and mouth, or the entire face. The air system mask forms an enclosed air cavity of fixed geometry that exhibits a particular set of acoustic resonances and anti-resonances (nulls) that are a function of mask volume and internal reflective surface geometries, and that alters the spectral properties of speech produced within the mask. More specifically, in characterizing the air mask audio path (FIG. 2), the most challenging part of the system is the acoustic transfer function (220) from the speaker's lips to the mask microphone. These spectral distortions can significantly degrade the performance of attached speech communication systems, especially systems using parametric digital codecs that are not optimized to handle corrupted speech. Acoustic mask distortion has been shown to affect communication system quality and intelligibility, especially when parametric digital codecs are involved. Generally, aside from the inhalation noise, the air system effects causing the largest loss of speech quality appear to be due to the poor acoustics of the mask.

FIG. 3 illustrates an example of a measured spectral magnitude response inside the mask (320) and at the mask microphone output (310) and a calculated combined transfer function (330) for the mask, microphone, and microphone amplifier. These particular data were obtained using a SCBA mask mounted on a head and torso simulator. The acoustic excitation consisted of a 3 Hz–10 KHz swept sine wave driving an artificial mouth simulator. As FIG. 3 illustrates, the spectrum is significantly attenuated at frequencies below 500 Hz and above 4.0 KHz, mostly due to a preamp band pass filter in the microphone, and contains a number of strong spectral peaks and notches in the significant speech pass band region between 50 and 4.0 KHz. These spectral peaks and notches are generally caused by reflections inside the mask that cause comb filtering, and by cavity resonance conditions. The significant spectral peaking and notching modulate the speech pitch components and formants as they move back and forth through the pass band, resulting in degraded quality and distorted speech. It may be desirable to determine a transfer function or transfer functions characterizing such a system with such transfer functions being used to define an equalization system to reduce speech distortion.

A number of proven techniques exist to adaptively determine a system transfer function and equalize a transmission channel. One effective method to determine a system transfer function is to use a broadband reference signal to excite the system and determine the system parameters. A problem in estimating the transfer function of many speech transmission environments is that a suitable broadband excitation signal is not readily available. One common approach is to use the long-term average speech spectrum as a reference. However, adaptation time using this reference can take a long time, particularly if the speech input is sparse. In addition, the long-term speech spectrum can vary considerably for and among individuals in public service activities that frequently involve shouting and emotional stress that can alter the speech spectrum considerably.

Another shortcoming associated with systems such as system 100 is the lack of more efficient methods and apparatus for measuring certain parameters of the mask wearer including, for example, biometric parameters. Measurement of such parameters of individuals working in hazardous environments, who may be using systems such as system 100, is important for monitoring the safety and performance of those individuals. For example, measurements of the individual's respiration rate and air consumption are important parameters that characterize his workload, physiological fitness, stress level, and consumption of the stored air supply (i.e. available working time). Conventional methods of measuring respiration involve the use of chest impedance plethysmography or airflow temperature measurements using a thermistor sensor. However, getting reliable measurements, using these conventional methods, from individuals working in physically demanding environments such as firefighting is more difficult due to intense physical movement that can cause displacement of body-mounted sensors and artifacts typically used to take the measurements.

Thus, there exists a need for methods and apparatus for effectively detecting and attenuating inhalation noise, equalizing speech (i.e., removing distortion effects), and measuring parameters associated with users in a system that includes a pressurized air delivery system coupled to a communication system.

BRIEF DESCRIPTION OF THE FIGURES

A preferred embodiment of the invention is now described, by way of example only, with reference to the accompanying figures in which:

FIG. 14 illustrates a signal from a microphone input that contains speech and air regulation inhalation noise;

FIG. 15 illustrates the average normalized model error of the signal illustrated in FIG. 14 as determined by the method illustrated in FIG. 13;

DETAILED DESCRIPTION OF THE INVENTION

Figure 1:
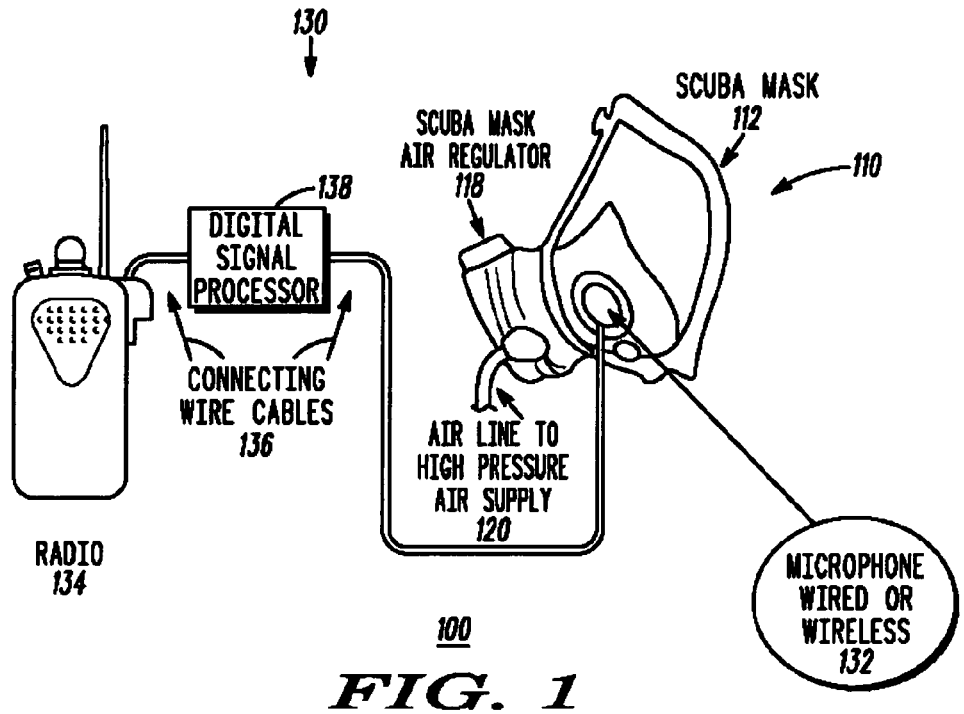
FIG. 1 illustrates a simple block diagram of a prior art system that includes a pressurized air delivery system for breathing coupled to a communication system.

While this invention is representative of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

Figure 4:
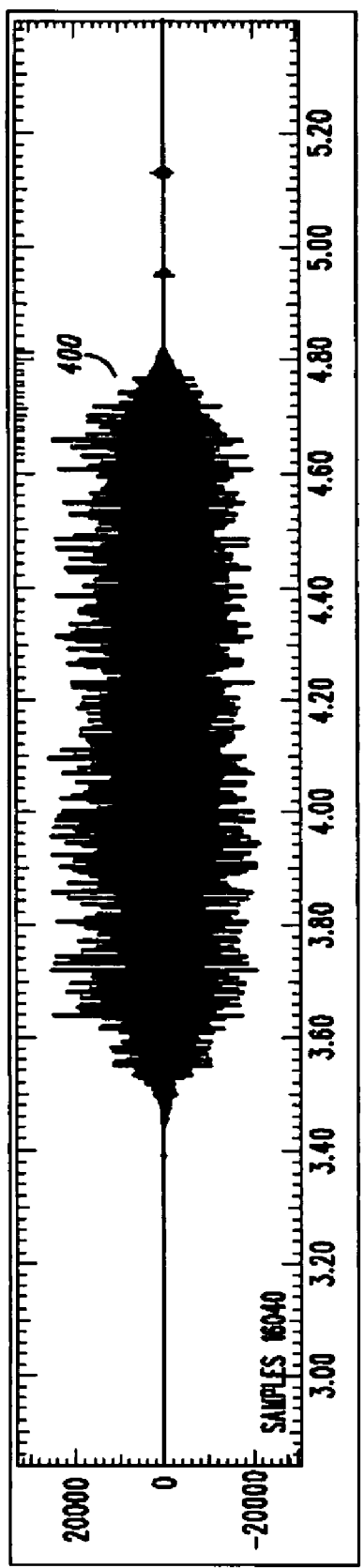
FIG. 4 illustrates an example of an inhalation noise generated by a SCBA air regulator.

Before describing in detail the various aspects of the present invention, it would be useful in the understanding of the invention to provide a more detailed description of the air regulator inhalation noise that was briefly described above. Inhalation noise is a result of high-pressure air entering a SCBA or other pressurized air delivery system mask when a person inhales and the regulator valve opens. Turbulence at the valve creates a very loud, broadband hissing noise, directly coupled into the SCBA mask, which is comparable in amplitude at the microphone with the speech signal. An example of a typical inhalation noise 400 recorded inside of a SCBA mask and its wide-band spectrogram 500 are shown, respectively, in FIGS. 4 and 5.

Figure 5:
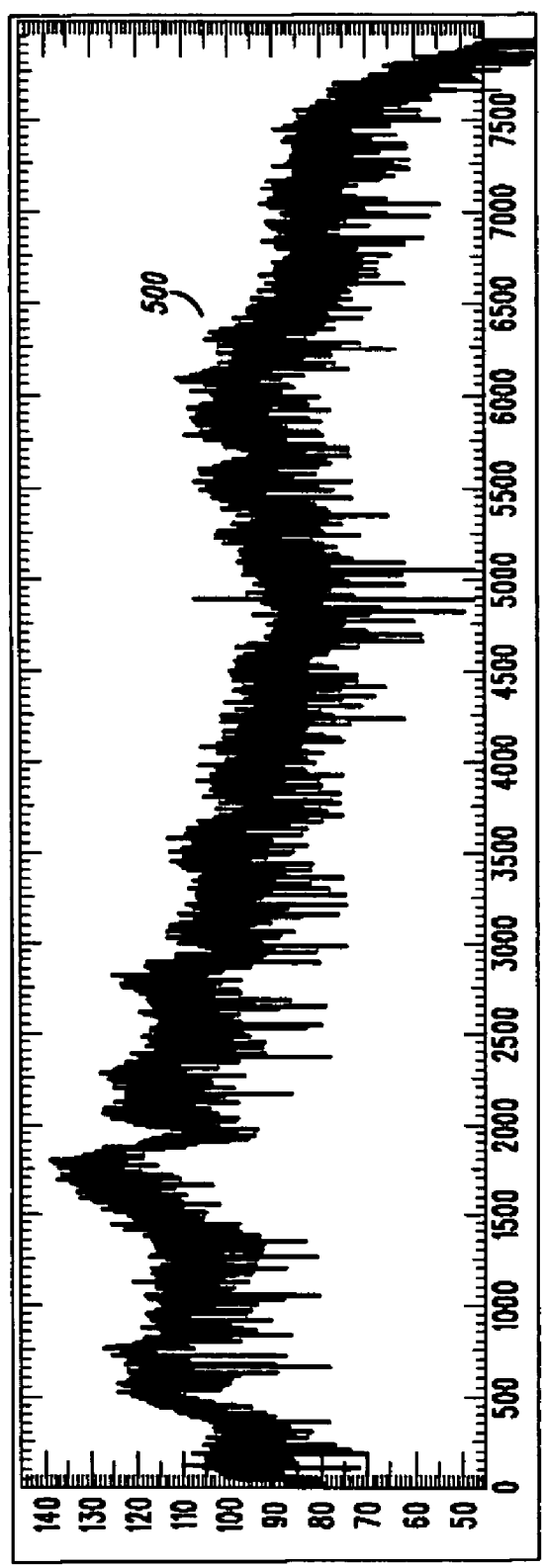
FIG. 5 illustrates the long-term magnitude spectrum of the inhalation noise illustrated in FIG. 4.
Figure 6:
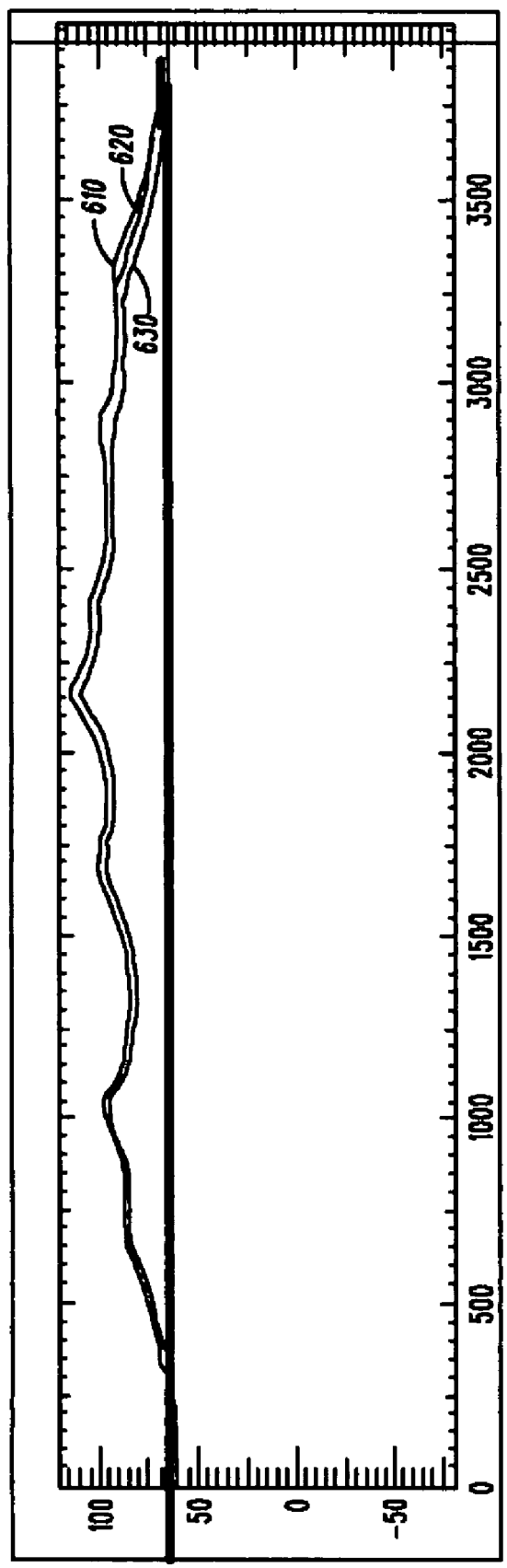
FIG. 6 illustrates four overlapping spectra of inhalation noises generated by a single speaker wearing a given SCBA mask.

As can be seen in FIG. 5, the noise spectrum is broadband with prominent spectral peaks occurring at approximately 500, 1700, 2700, and 6000 Hz. The peaks are due to resonances within the mask and comb filtering due to internal mask reflections, and may vary in frequency and magnitude with different mask models, sizes, and configurations. The coloration of the noise spectrum is typically stationary for a particular mask/wearer combination since the gross internal geometry is essentially constant once the mask is placed on the face. This is demonstrated in FIG. 6 where the spectra of three separate inhalation noises (610, 620 and 630) from a SCBA mask microphone, for the same speaker wearing a given SCBA mask, are shown superimposed. This consistency has also been observed for different speakers and for masks from different manufacturers. Moreover, high spectral similarity of the air regulator noise from different speakers wearing the same mask was also observed.

Figure 7:
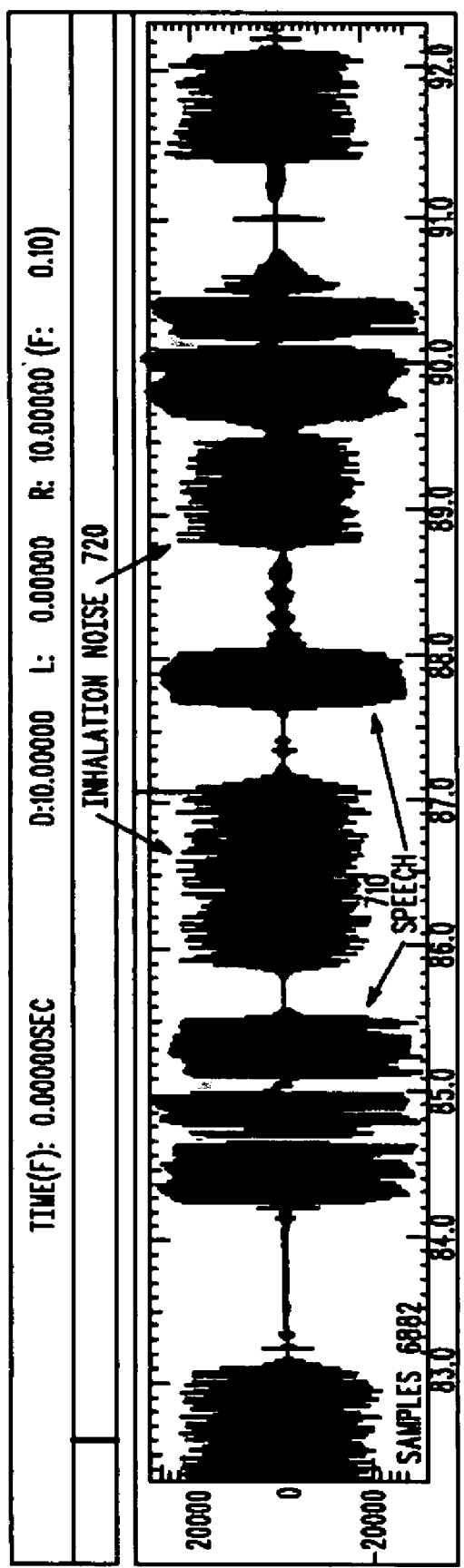
FIG. 7 illustrates audio output from a SCBA microphone showing inhalation noise bursts intermingled with speech.

Finally, FIG. 7, illustrates an example of speech 710 recorded from a SCBA system. As FIG. 7 demonstrates, the effects of inhalation noise 720 are not on the speech itself, since people do not normally try to speak while inhaling. However, the noise is of sufficient energy and spectrum to cause problems with speech detector and noise suppression circuitry in radios and to present a listening annoyance.

In a first aspect of the present invention is a method and apparatus for detecting and eliminating inhalation noise in a pressurized air delivery system coupled to a communication system, such as a system 100 illustrated in FIG. 1. The method in accordance with this embodiment of the present invention is also referred to herein as the ARINA (Air Regulator Inhalation Noise Attenuator) method. The basis of the ARINA method for identifying and eliminating air regulator inhalation noise is the relative stationarity of the noise as compared to speech and as compared to other types of noise such as, for instance, various environmental noises.

Figure 8:
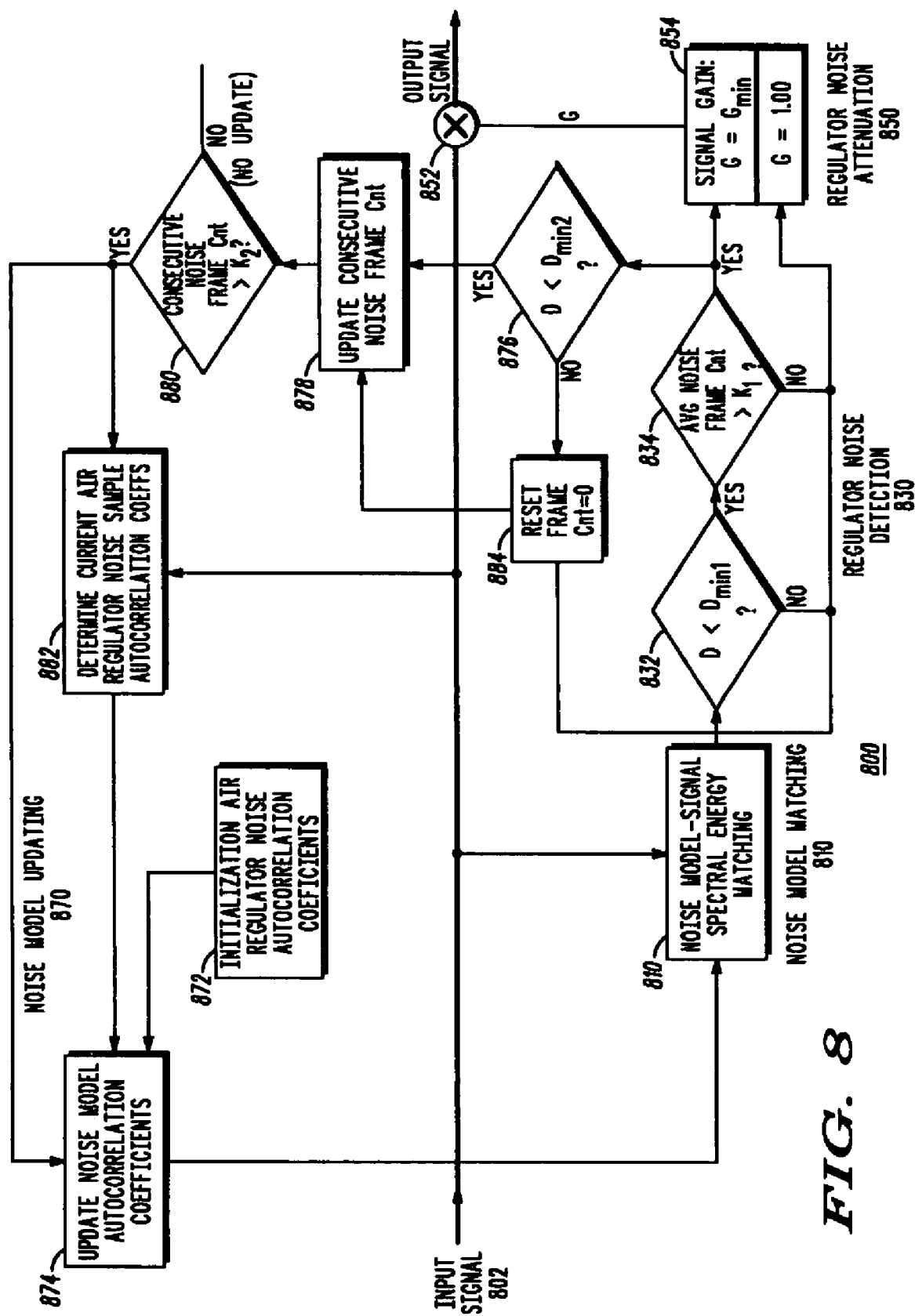
FIG. 8 illustrates a simple block diagram of a method for detecting and eliminating inhalation noise in accordance with one embodiment of the present invention.

A block diagram of the ARINA method 800 is shown in FIG. 8 and can be divided into four sections: Noise Model Matching 810, Noise Detection 830, Noise Attenuation 850, and Noise Model Updating 870.

The basic methodology of the ARINA method 800 can be summarized as follows. Method 800 models the inhalation noise preferably using a digital filter (e.g. an all pole linear predictive coding (LPC) digital filter). Method 800 then filters the audio input signal (i.e., speech and noise picked up by the mask microphone) using an inverse of the noise model filter and compares the energy of the output of the inverse noise model filter with that of the input signal or other energy reference. During the signal periods in which a close spectral match occurs between the input signal and the model, the regulator inhalation noise comprising the input signal may be attenuated to any desired level.

Figure 9:
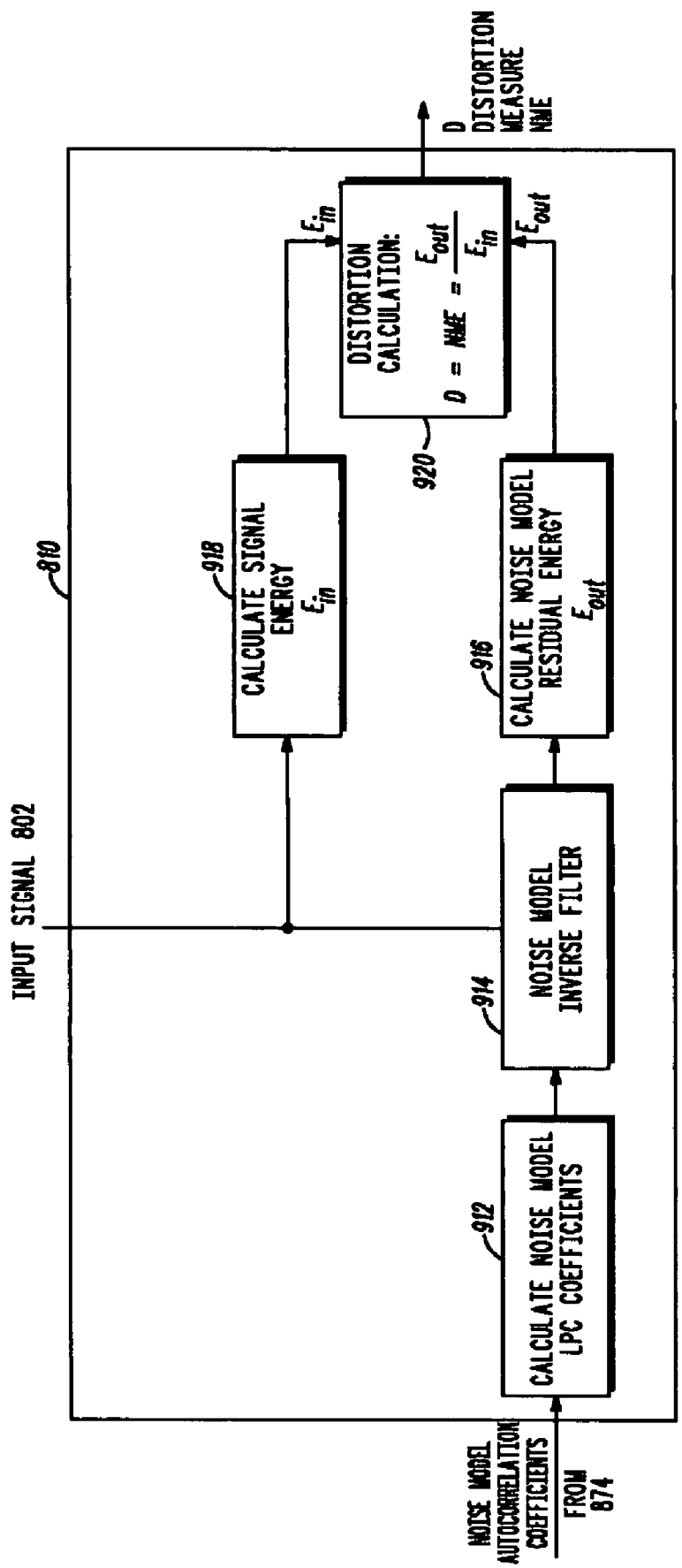
FIG. 9 illustrates a simple block diagram of one embodiment of a spectral matcher used in the method of FIG. 8.
Figure 10:
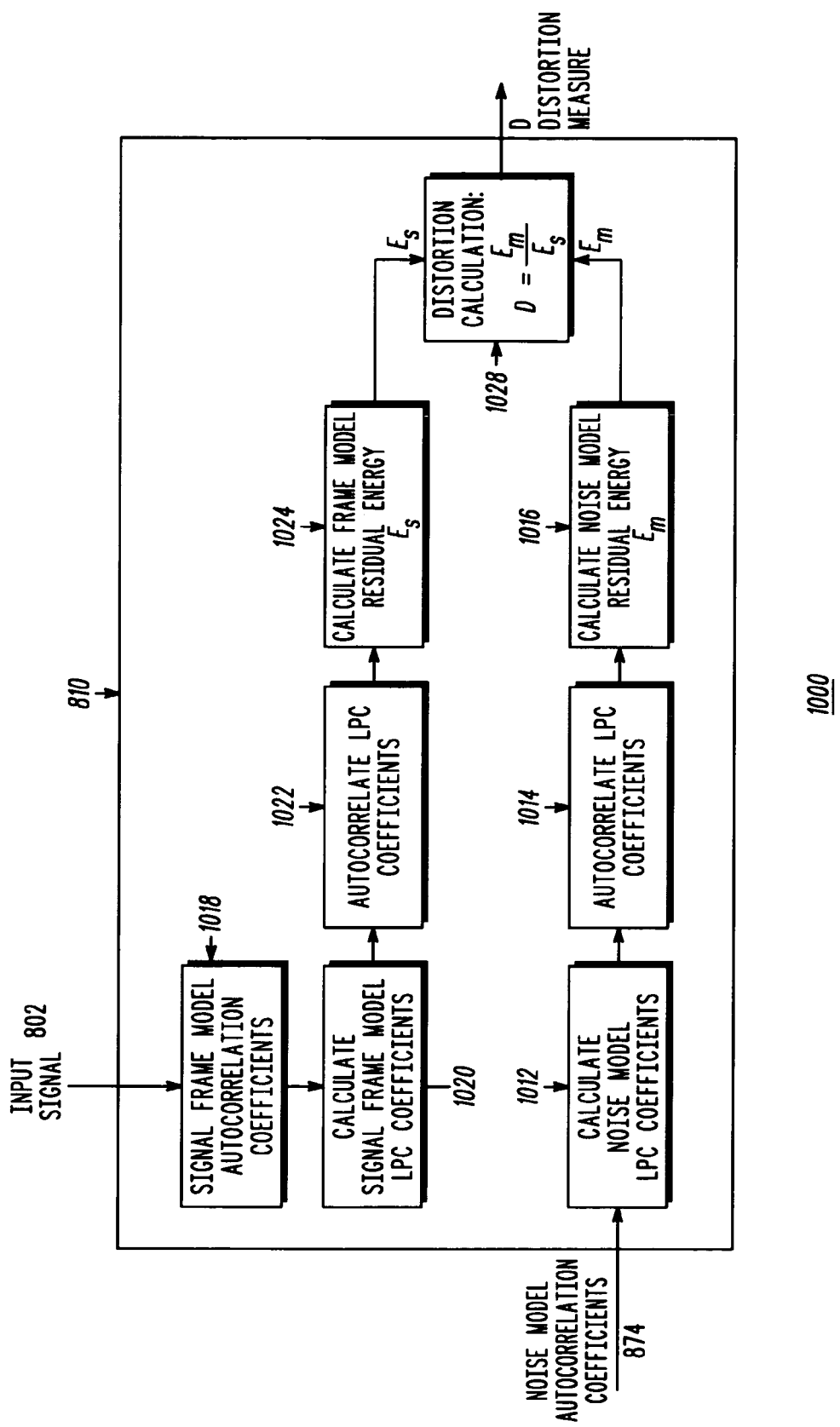
FIG. 10 illustrates a simple block diagram of another embodiment of a spectral matcher used in the method of FIG. 8.

Turning to the specifics of the ARINA method 800 as illustrated in FIG. 8, the first step in the processing is to detect the occurrence of the inhalation noise by continuously comparing an input signal 802 against a reference noise model via the Noise Model Matching section 810 of method 800, which may in the preferred embodiment be implemented in accordance with FIG. 9 or FIG. 10 depending on the complexity of implementation that can be tolerated. However, those of ordinary skill in the art will realize that alternative spectral matching methods may be used. The two preferred matching methods indicated above as illustrated in FIG. 9 and FIG. 10 are referred to herein as the Normalized Model Error (or NME) method and the Itakura-Saito (or I-S) distortion method. In both methods, the reference noise model is represented by a digital filter (912, 1012) that approximates the spectral characteristics of the inhalation noise. In the preferred embodiment, this model is represented as an all-pole (autoregressive) filter specified by a set of LPC coefficients. However, those of ordinary skill in the art will realize that alternate filter models may be used in place of the all-pole model such as, for instance, a known ARMA (autoregressive moving average) model.

The reference noise model filter coefficients are obtained from a set of autocorrelation coefficients derived from at least one digitized sample of the inhalation noise. An initial noise sample and corresponding initial autocorrelation coefficients (872) may be obtained off-line from any number of noise pre-recordings and is not critical to the implementation of the present invention. Moreover, experiments have shown that the initial noise sample from one SCBA mask, for example, also works well for other masks of the same design and in some cases for masks of different designs. The autocorrelation coefficients can be calculated directly from raw sampled noise data, or derived from other commonly used spectral parameter representations such as LPC or reflection coefficients, using common methods well known to those skilled in the art.

In the preferred embodiment, the noise model autocorrelation coefficients are calculated according to the following standard formula:

$$R_i = \sum_{n=1}^{N-i} x_n x_{n+i} \quad i = 0, 1, 2, \ldots, p, \; p \ll N \qquad \text{EQ-1}$$

where $R_i$ is the ith coefficient of a maximum of p autocorrelation coefficients, $x_n$ is the nth sample of a typical inhalation noise signal sample segment in which there are a maximum of N samples, and $R_0$ represents the energy of the entire segment. The order of the autocorrelation function, p, is typically between 10 and 20 with the value for the preferred embodiment being 14. Moreover, ideally the N signal samples are windowed using a Hamming window before the autocorrelation is performed to smooth the spectral estimate. The Hamming window is described by:

$$w(n)=0.54-0.46\cos(2\pi n/N), n=0,1,2,\ldots,N-1. \qquad \text{EQ-2}$$

Those of ordinary skill in the art will realize that other windowing methods may also be used.

The noise model autocorrelation coefficients are next used to determine a set of $10^{th}$ order noise model LPC coefficients, $a_1, a_2, \ldots, a_p$, representing an all-pole linear predictive model filter with a z-domain representation transfer function of:

$$H(z) = \frac{1}{1+a_1 z^{-1}+a_2 z^{-2}+\ldots+a_p z^{-p}}, \qquad \text{EQ-3}$$

where $z=e^{-j n \omega T}$ is the z-transform variable. In this example $10^{th}$ order LPC coefficients were determined. However, a different order of LPC coefficients may be selected based on the particular implementation. The autocorrelation-to-LPC parameter transformation (step 912, 1012) may be done using any number of parameter transformation techniques known to those skilled in the art. In the preferred embodiment, the LPC parameters are derived from the autocorrelation parameters using the Durbin method well known to those skilled in the art.

Turning now to the specifics of the NME spectral matching method illustrated in FIG. 9, the derived all-pole LPC noise filter model is inverted to form an inverse LPC filter (step 914):

$$\hat{H}(z)=1+a_1 z^{-1}+a_2 z^{-2}+\ldots+a_p z^{-p}. \qquad \text{EQ-4}$$

Ideally a low-pass filtered and sampled audio input signal 802 obtained from the mask microphone and containing speech and inhalation noise, S(z), is passed through the inverse filter $\hat{H}(z)$ (step 914) to obtain an output signal, $$Y(z)=S(z)\hat{H}(z). \qquad \text{EQ-5}$$

The energies, $E_{in}$, $E_{out}$, of the inverse filter input and output signals are then calculated (respectively at steps 918 and 916) and a distortion measure D is calculated at step 920 and functions as a similarity measure between the noise model and the input signal. The theoretical lower bound on D is zero for an infinite order, but in practice, the lower bound will be determined by the input signal and how well it matches the noise model of finite order. In this implementation, the distortion measure is defined by a ratio of $E_{out}$ to $E_{in}$, referred to as the normalized model error (NME), calculated at step 920 as:

$$D=NME=\frac{E_{out}}{E_{in}}=\frac{|Y(z)|^2}{|S(z)|^2}. \qquad \text{EQ-6}$$

The energy of the input signal may then be removed in accordance to how well it matches the noise model. In the preferred embodiment, the above described signal filtering is done via convolution in the time domain although it could also be done in the frequency domain as indicated in the preceding equations.

The signal processing for the ARINA method 800 is generally done on a segmented frame basis. In the preferred embodiment, the input signal 802 is low-pass filtered, sampled at 8.0 KHz, buffered into blocks of 80 samples (10 msec), and passed through the inverse noise model filter (EQ-5). Thus, all filtering is ideally done on consecutive, 80 sample segments of the input signal 802. The normalized model error (NME) of the inverse noise model filter is then calculated by dividing the filter output frame energy by the input signal frame energy (EQ-6). This calculation, however, is ideally done on a sub-frame basis for better time resolution. Thus, each 80-point frame is divided into sub-frames, for example 4, 20-point sub-frames, although alternative sub-frame divisions may be used depending on the degree of accuracy required. The overall normalized model error signal (NME) may then be smoothed by averaging the output filter energy $E_{out}$ of the last 16 sub-frames and dividing that quantity by the average of the corresponding time-aligned 16 sub-frame input filter energies $E_{in}$. This does not add any delay to the analysis but helps remove transient dropouts and the effects of other loud background noises that may alter the regulator noise spectrum. The average NME value is thereby used, in this implementation of the present invention, as a measure of the noise model to input signal spectral similarity.

In the preferred embodiment, the second, more complex but more accurate noise model matching method 810 as illustrated in FIG. 10 is a modification of the Itakura-Saito distortion method. The I-S method of determining the spectral similarity between two signals is well known by those skilled in the art. In this method the residual noise model inverse filter energy is compared with the residual energy of the "optimal" signal filter instead of with the input signal energy as in the previously described NME method. The filter is "optimal" in the sense that it best matches the spectrum of the current signal segment.

The residual energy corresponding to the optimally filtered signal is calculated using steps 1018–1024. In the I-S method at step 1018, ideally two consecutive 80 sample buffers of the input signal 802 are combined into a single 160 sample segment. The 160 sample segment is windowed preferably using a 160 point Hamming window given by:

$$w(n)=0.54-0.46\cos(2\pi n/160), n=0,1,2,\ldots,159. \qquad \text{EQ-7}$$

The windowed signal data is then autocorrelated using the method described in EQ-1. These autocorrelation coefficients generated in step 1018 are designated as $\hat{R}_i$, $i=0,1,2,\ldots,p$. A corresponding set of LPC coefficients is derived from the autocorrelation coefficients preferably using the Durbin algorithm in step 1020 in the same manner as used for generating the reference noise model parameters in step 1012. The signal model LPC coefficients generated in step 1020 are designated as $\hat{a}_i$ $i=1,2,\ldots,p$. In step 1022, these LPC coefficients (step 1020) are autocorrelated according to EQ-9 below yielding $\hat{b}_i$. Using these parameters, the residual energy of the signal, $E_s$, passing through this filter is calculated at step 1024 as:

$$E_s = \hat{b}_0 \hat{R}_0 + 2\sum_{i=1}^{p} \hat{b}_i \hat{R}_i, \qquad \text{EQ-8}$$

-continued $$\hat{b}_i = \sum_{j=0}^{p-i} \hat{a}_j \hat{a}_{j+i}, \quad 0 \le i \le p, \hat{a}_0 = 1. \quad \text{EQ-9}$$

The energy of the input signal passing through the noise model is calculated using steps 1012–1016. At step 1012 the noise model LPC coefficients are calculated from the noise model autocorrelation coefficients (874) as described above. These LPC coefficients generated at step 1012 are designated as $a_i$, $i=1,2, \ldots, p$. At step 1014, the LPC coefficients (from step 1012) are autocorrelated according to EQ-11 below yielding $b_i$. Using these parameters and the autocorrelation sequence calculated at step 1018, $\hat{R}_i$, the energy of the signal passing through the reference noise model is calculated at step 1016 as given by EQ-10:

$$E_m = b_0 \hat{R}_0 + 2 \sum_{i=1}^{p} b_i \hat{R}_i, \quad \text{EQ-10}$$

$$b_i = \sum_{j=0}^{p-i} a_j a_{j+i}, \quad 0 \le i \le p, a_0 = 1. \quad \text{EQ-11}$$

A measure of the spectral distortion, D, of the "optimal" signal model to the reference noise model is calculated at step 1028 as defined as:

$$D = \frac{E_m}{E_s}. \quad \text{EQ-12}$$

The more similar the signal model is to the reference noise model the closer the distortion measure is to 1.0 which is the lower bound. This distortion measure is used by the Noise Detection section 830 of the ARINA method 800 to determine the presence of inhalation noise. The I-S distortion measure is calculated using 160 samples in the preferred embodiment. The inhalation noise classification as determined by the I-S distortion measure is associated with each 80 sample frame of the 160 sample segment. Moreover, steps 1012 and 1014 need only be performed to generate an initial noise model (e.g., based on initial autocorrelation coefficients 872) or to update the noise model in accordance with the Noise Model Updating section 870 referred to above and described in detail below.

In the Noise Detection portion 830 of the ARINA method 800, the value derived from the spectral match 810 (i.e. the NME or the I-S distortion measure which represents the similarity measure between the input signal and the noise model) is then compared (step 832) to an empirically derived threshold value (e.g., $D_{min1}$). This detection threshold is selected to detect the presence of inhalation noise while not misclassifying speech or other types of noise as inhalation noise.

Moreover, depending on the specificity of the noise filter model, the spectral variations of the inhalation noise, and the similarity of some speech sounds to the noise model, for instance, false detections can occur. Therefore, since the duration of a true air regulator inhalation noise is fairly long compared to the speech artifacts, a noise duration threshold test is ideally also applied (step 834). Thus, the detection threshold must be met for a predetermined number of consecutive frames "$K_1$" (e.g. 4 frames) before detection is validated. Relative signal energy, waveform zero-crossings, and other feature parameter information may be included in the detection scheme to improve speech/inhalation noise discrimination. Thus if both threshold criteria are met (from steps 832 and 834), the spectral match is deemed acceptably close and an inhalation noise is assumed currently present.

In the Noise Attenuation portion 850 of the ARINA method 800, the output of the Noise Detection portion 830 is used to gate an output signal multiplier (852) through which the input signal 802 is passed. If the inhalation noise was detected, the multiplier gain G is set at step 854 to some desired attenuation value "$G_{min}$". This attenuation gain value may be 0.0 to completely eliminate the noise or may be set to a higher value to not completely eliminate the inhalation noise but to suppress it. Total suppression may not be desired to assure a listener that the air regulator is functioning. In the preferred embodiment $G_{min}$ has a value of 0.05. Otherwise if inhalation noise is not detected, the gain G is ideally set to 1.0 such as not to attenuate the speech signal. Variations of this gating/multiplying scheme can be employed. For example variations may be employed that would enable that the attack and decay of the gating to be less abrupt, reducing the possibility of attenuating speech that may occur directly before or after an inhalation noise, thereby improving the perceived quality of the speech. Moreover as can be readily seen from method 800, an important benefit of this invention is that the original signal is not altered except when regulator noise is detected, unlike conventional, continuous noise filtering methods.

An important component of the ARINA method 800 is the ability to periodically update the noise model for detection purposes. For example, over time, movement of the air mask on the face may cause changes in its effects on the acoustic transfer function. Also, an air mask worn by different people or the use of different masks will mean that the spectrum of initial reference noise model may deviate from the actual inhalation noise spectrum. By periodically updating the original reference noise model, an accurate current reference noise model can be maintained. Accordingly, the Noise Model Updating Section 870 of the ARINA method 800 is used to update the noise model.

The Noise Model Updating section 870 uses the output of the Noise Detection section 830 to determine when the reference LPC filter model of the regulator inhalation noise should be updated. For example, the output from the Noise Detection section 830 may be compared to a second empirically determined threshold value (e.g., $D_{min2}$) at step 876 to determine whether to update the noise model. When the threshold is met, a number of consecutive sub-frames detected as inhalation noise may be counted (step 878), and the signal samples in each sub-frame stored in a buffer. When the number of consecutive noise sub-frames exceeds a threshold number "$K_2$" (e.g., 8 sub-frames, 160 samples in the preferred embodiment) a decision is made to update the noise model at step 880. If a non-noise sub-frame is detected (e.g., at any of steps 832, 834 and 876), the noise frame count is reset to zero at step 884, and the noise frame count is updated at step 878. The autocorrelation coefficients for the "$K_2$" consecutive signal sub-frames representing the currently detected inhalation noise may then be calculated at step 882 using the previously stated formulas EQ-1 and EQ-2.

These new autocorrelation coefficients are used to update the noise model autocorrelation coefficients at step 874.

Ideally the autocorrelation coefficients calculated at step 882 are averaged with the previous noise model autocorrelation coefficients at step 874 using a simple weighting formula such as, for instance:

$$R_i^{REF} = \alpha R_i^{REF} + (1-\alpha) R_i^{NEW}, \quad \text{EQ-13}$$

where $R_i^{REF}$ are the autocorrelation coefficients of the current reference noise model, $R_i^{NEW}$ are the autocorrelation coefficients of the currently detected inhalation noise sample, and $\alpha$ is a weighting factor between 1.0 and 0.0 that determines how fast the initial reference model is updated. This weighting factor can be adjusted depending on how fast the spectral characteristics of the inhalation noise change, which as noted previously, is usually slow. A new set of LPC coefficients for the noise model inverse filter is then recalculated from the updated model autocorrelations at steps 912 and 1012. Constraints can be placed on the adjustment to the noise model so that large deviations from the noise model cannot occur due to false detections. In addition, the initial reference noise model coefficients (872) are stored so that the system can be reset to the initial model state if necessary. The adaptation capability of method 800 described above by reference to the Noise Model Updating section 870 enables the system to adapt to the characteristics of a particular mask and regulator and enables optimal detection performance.

Advantages of the ARINA method 800 include that the speech signal itself is not irreversibly affected by the processing algorithm, as is the case in algorithms employing conventional continuous filtering. An additional advantage is that the LPC modeling used here is simple, easily adaptable in real-time, is straightforward, and computationally efficient. Those of ordinary skill in the art will realize that the above advantages were not meant to encompass all of the advantages associated with the ARINA embodiment of the present invention but only meant to serve as being representative thereof.

In a second aspect of the present invention is a method and apparatus for equalizing a speech signal in a pressurized air delivery system coupled to a communication system, such as a system 100 illustrated in FIG. 1. The method in accordance with this embodiment of the present invention is also referred to herein as the AMSE (Air Mask Speech Equalizer) method. The basis of the AMSE method for equalization is the relative stationarity of the noise as compared to speech and as compared to other types of noise such as, for instance, various environmental noises. Since the same mask resonance conditions affect both the regulator noise and a speech signal, equalizing for the noise should also yield an equalizer appropriate for equalizing the speech signal, although peaks and nulls due to sound reflections will be slightly different between the noise and the speech due to source location differences between the speech and the noise.

The AMSE method uses the broadband air regulator inhalation noise, present in all mask-type pressurized air breathing systems (e.g. an SCBA), to estimate the acoustic resonance spectral peaks and nulls (i.e. spectral magnitude acoustic transfer function) produced by the mask cavity and structures. This spectral knowledge is then used to construct a compensating digital inverse filter in real time, which is applied to equalize the spectrally distorted speech signal and produce an output signal approximating the undistorted speech that would be produced without the mask. This action improves the quality of the audio obtained from the mask microphone and can result in improved communications intelligibility.

Figure 11:
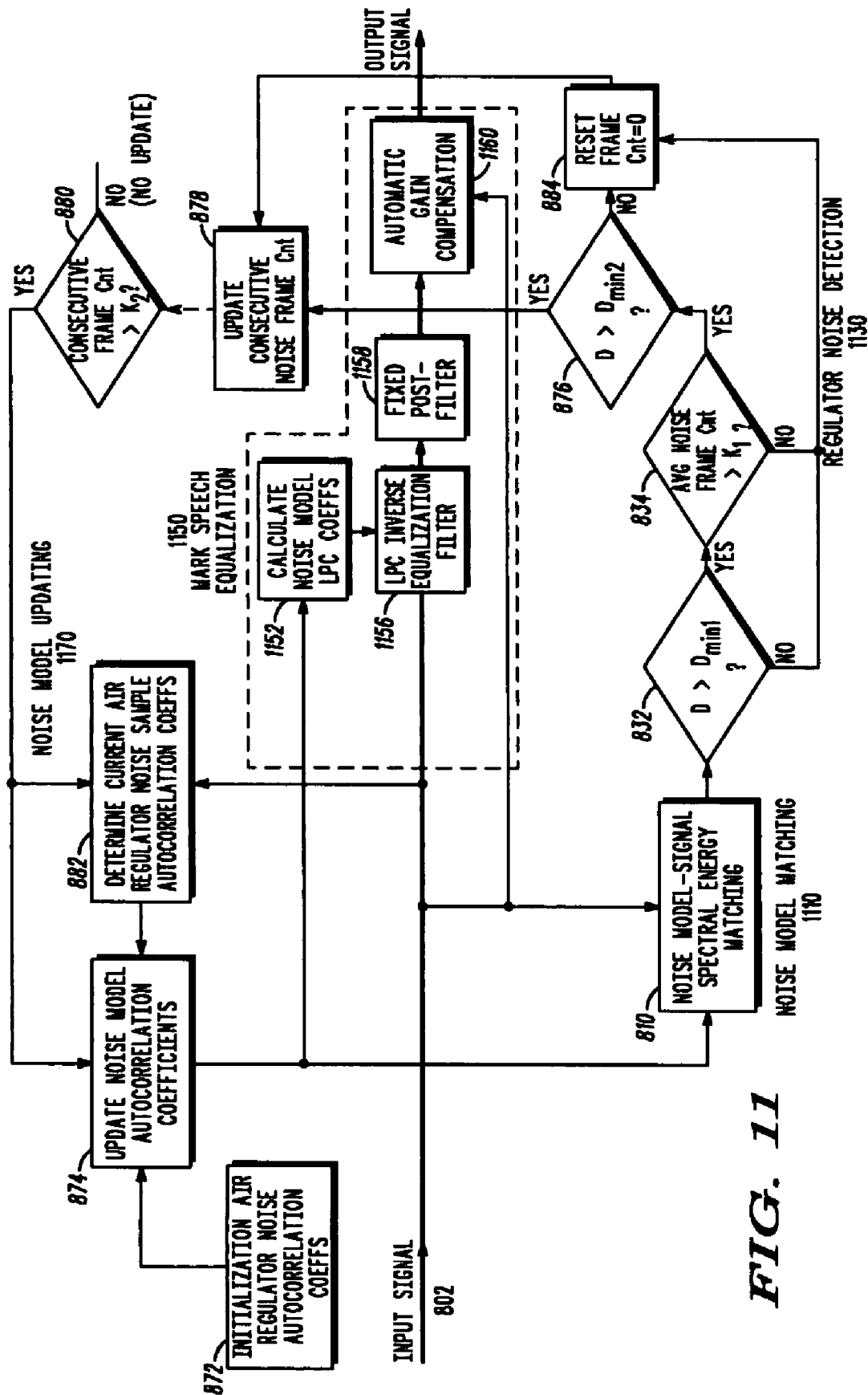
FIG. 11 illustrates a simple block diagram of a method for equalizing a speech signal in accordance with another embodiment of the present invention.

Turning to the specifics of the AMSE method, a block diagram of the method 1100 is shown in FIG. 11 and can be divided into four sections: Noise Model Matching 1110, Noise Detection 1130, Mask Speech Equalization 1150, and Noise Model Updating 1170. The Noise Model Matching, Noise Detection and Noise Model Updating sections of the AMSE method are ideally identical to the corresponding sections of the ARINA method that were described above in detail. Therefore, for the sake of brevity, a detailed description of these three sections will not be repeated here. However, following is a detailed description of the Mask Speech Equalization section 1150 (within the dashed area) of the AMSE method 1100.

Figure 2:
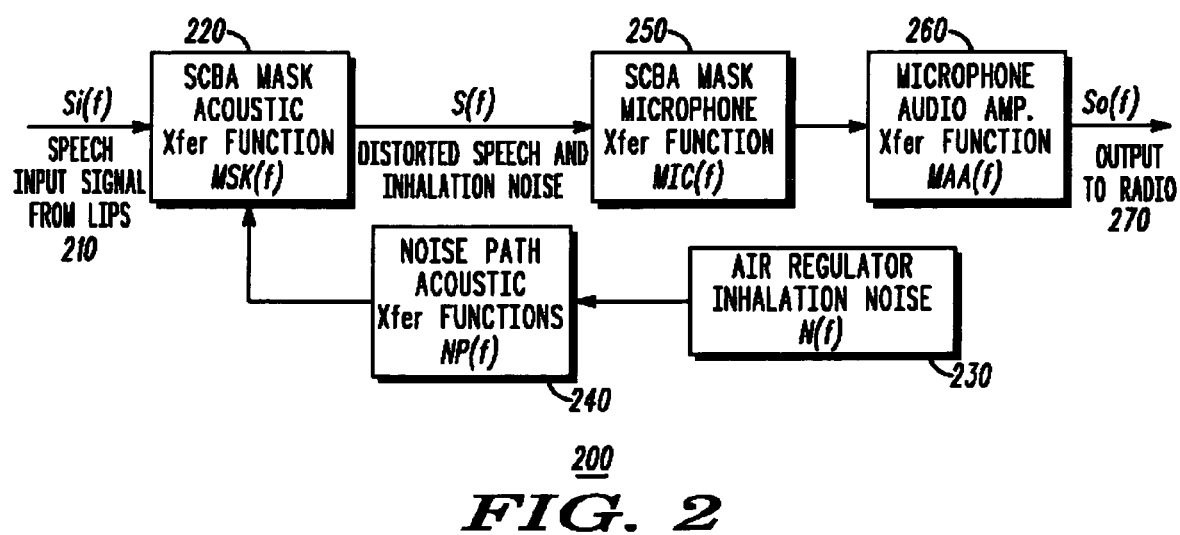
FIG. 2 illustrates the mask-to-radio audio path of the system illustrated in FIG. 1.
Figure 3:
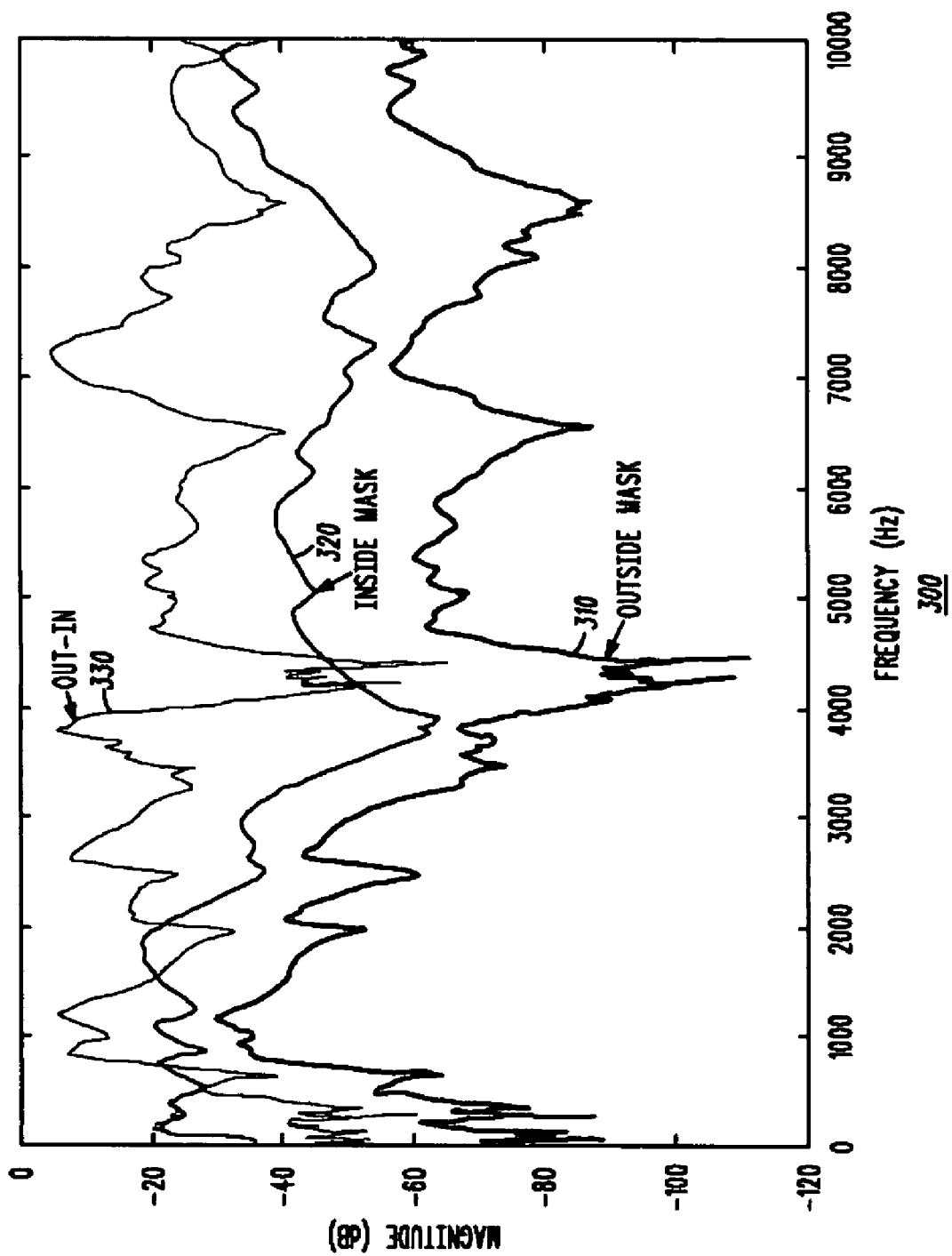
FIG. 3 illustrates an example of a measured spectral magnitude response inside a mask and at the mask microphone output and a calculated combined transfer function for the mask, microphone, and microphone amplifier.

Using the Speech Equalization Section 1150 of the AMSE method 1100, the inhalation noise reference autocorrelation coefficients are used to generate an nth order LPC model of the noise at step 1152 using EQ-3 above. The LPC model generated in step 1152 characterizes the transfer function of the mask, e.g., MSK(f) in FIG. 2, and for the inhalation noise also includes the noise path transfer function NP(f). Preferably a $14^{th}$ order model is suitable but any order can be used. Those of ordinary skill in the art will realize that alternate filter models may be used in place of the all-pole model such as, for instance, a known ARMA (autoregressive moving average) model. Moreover, the filtering operations may be implemented in the frequency domain as opposed to the time domain filtering operations described above with respect to the preferred embodiment of the present invention.

The LPC model coefficients are then preferably used in an inverse filter (in accordance with EQ-4) through which the speech signal is passed at step 1156. Passing the speech signal through the inverse filter effectively equalizes the input signal, thereby removing the spectral distortions (peaks and notches) caused by the mask transfer function MSK(f) in FIG. 2. Post filtering at step 1158 using a suitable fixed post-filter is ideally performed on the equalized signal to correct for any non-whiteness of the inhalation noise, or to give the speech signal a specified tonal quality to optimally match the requirements of a following specific codec or radio. This post-filtering may also be used to compensate for the noise path transfer function NP(f) in FIG. 2.

Figure 12:
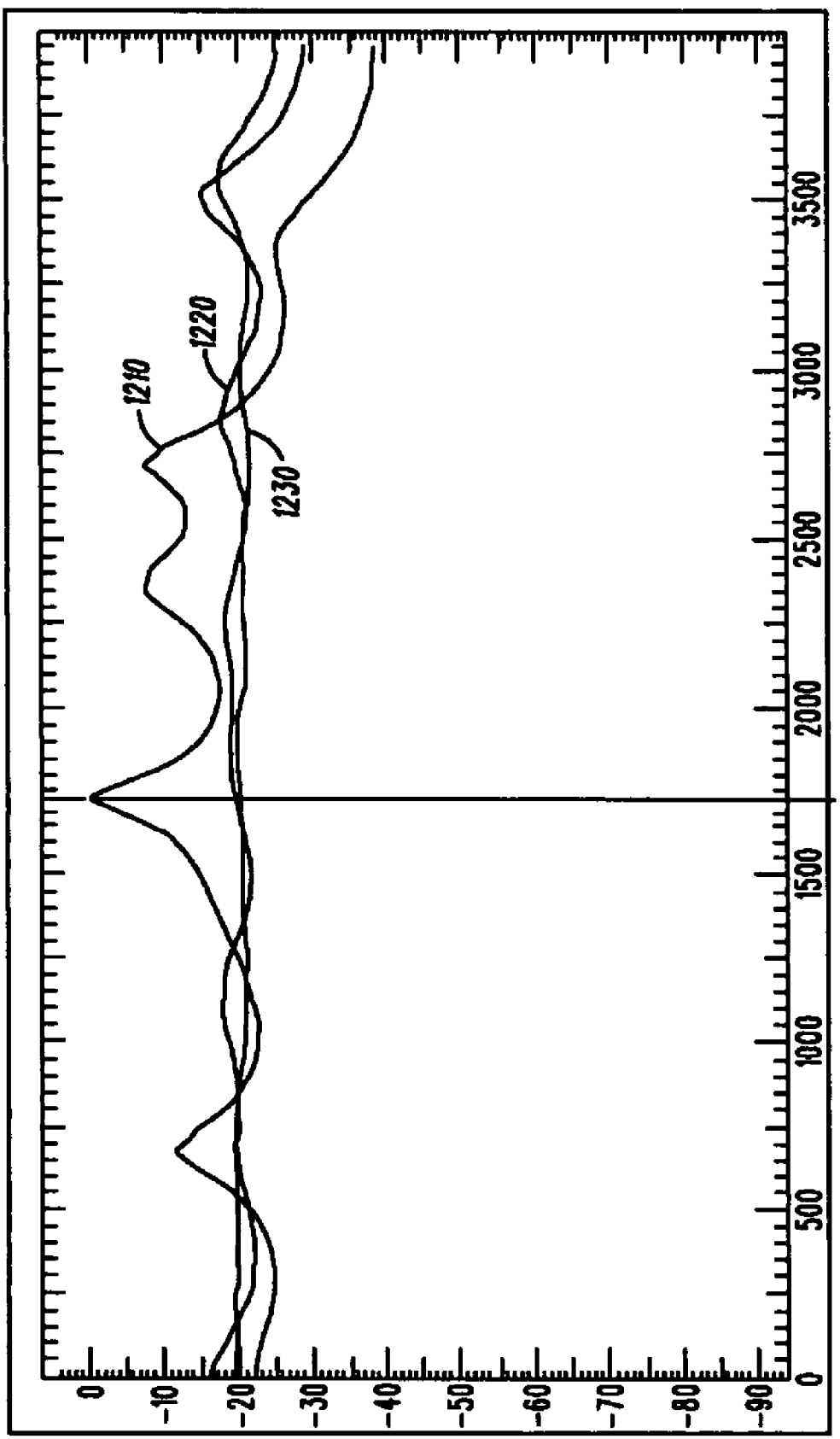
FIG. 12 illustrates an inhalation noise spectrum before equalization as compared to the spectra after $14^{th}$ order and $20^{th}$ order LPC inverse filter equalization in accordance with the present invention.

The effect of the equalizer of the AMSE method 800 on air regulator noise is shown in FIG. 12 for two different order equalization filters. Specifically, FIG. 12 illustrates a spectral representation 1210 of an inhalation noise burst before equalization. Further illustrated are the spectra of the inhalation noise after equalization using a $14^{th}$ order equalization filter (1220) and a $20^{th}$ order equalization filter (1230). As can be seen, the spectral peaking is flattened extremely well by the $20^{th}$ order equalization filter and reasonable well using the $14^{th}$ order equalization filter. Moreover, listening tests on mask speech equalized by these filters showed that the quality of speech was significantly improved by use of the equalization filters as compared to the un-equalized speech. In addition, little difference in perceived quality of the speech was found between the two filter orders.

Advantages of the AMSE algorithm approach include: 1) it uses a regular, spectrally stable, broadband regulator noise inherent in an air-mask system as an excitation source for determining mask acoustic resonance properties; 2) system transfer function modeling is accomplished in real-time using simple, well established, efficient techniques; 3) equalization is accomplished in real-time using the same efficient techniques; and 4) the system transfer function model is continuously adaptable to changing conditions in real time.

Those of ordinary skill in the art will realize that the above advantages were not meant to encompass all of the advantages associated with the AMSE embodiment of the present invention but only meant to serve as being representative thereof.

In a third aspect of the present invention is a method and apparatus for determining the duration and frequency of inhalation noise and determining respiration rate and air usage volume in a pressurized air delivery system coupled to a communication system, such as a system 100 illustrated in FIG. 1. The method in accordance with this embodiment of the present invention is also referred to herein as the INRRA (Inhalation Noise Respirator Rate Analyzer) method. The INRRA method is essentially an indirect way of measuring respiration by monitoring the sound produced by the air regulator instead of measuring breathing sounds from a person. The basis of the INRRA method is that a pressurized air breathing system such as an SCBA has one-way airflow. Air can enter the system only from the air source and regulator, and exit only through an exhaust valve. The intake and exhaust valves cannot be open at the same time. Thus, regulator intake valve action is directly related to the user's respiration cycle.

One indicator of the opening of the regulator intake valve is the regulator inhalation noise. Inhalation noise is a result of higher-pressure air entering an SCBA or other pressurized air delivery system mask. The mask is airtight so when a person inhales it produces a slight negative pressure within the mask that causes the regulator valve to open and pressurized tank air to enter. Air turbulence across the valve creates a loud, broadband hissing noise that is directly coupled into the SCBA mask, can be picked up by a microphone, and occurs for every inhalation. As explained previously, the noise is abrupt and has a very constant amplitude over the duration of the inhalation, providing very good start and end time resolution. For a given mask type and wearer, the spectral characteristics of the inhalation noise are very stable, as opposed to direct human breath sounds which vary considerably based on factors such as the size of the mouth opening, vocal tract condition, and lung airflow. INRRA capitalizes on the stability of the air regulator inhalation noise as a measure of respiratory rate.

INRRA uses a matched filtering scheme to identify the presence of an inhalation noise by its entire spectral characteristic. In addition, INRRA is capable of adapting to changes in the spectral characteristics of the noise should they occur, thus providing optimal differentiation between the inhalation noise and other sounds. By calculating the start of each inhalation, the instantaneous respiration rate and it's time average can be easily calculated from the inhalation noise occurances. In addition, by measuring the end and calculating the duration of each inhalation noise, and providing some information about the predictable mask regulator flow rate, the system can provide an estimate of the airflow volume. This may be accomplished using only the signal from the microphone recording the inhalation noise.

Figure 13:
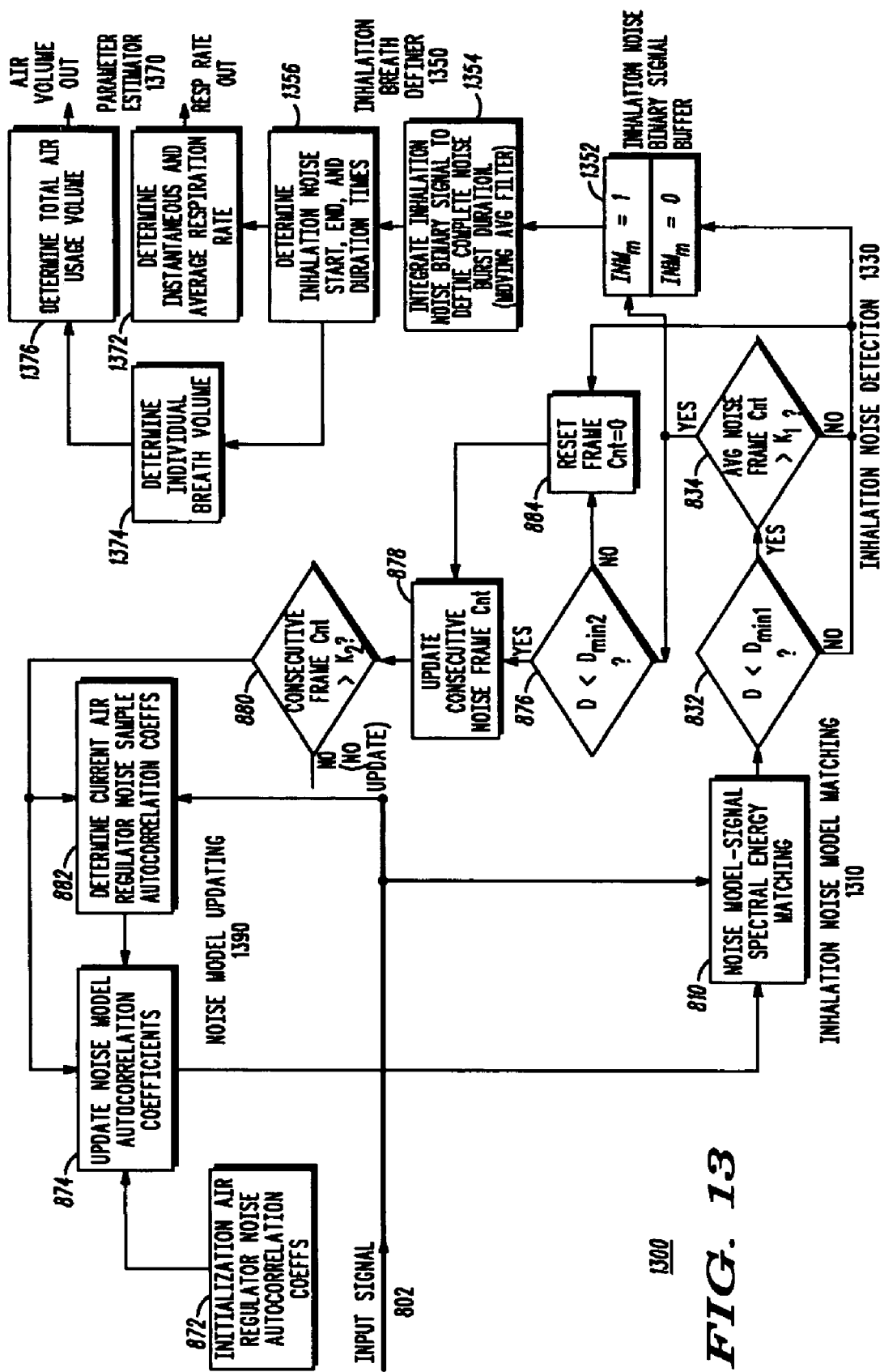
FIG. 13 illustrates a simple block diagram of a method for determining the duration of frequency of inhalation noise and determining respiration rate and air usage volume in accordance with another embodiment of the present invention for use in measuring biometric parameters.

A block diagram of the INRRA method 1300 is shown in FIG. 13 and can be divided into five sections: Noise Model Matching 1310, Noise Detection 1330, Inhalation Breath Definer 1350, Parameter Estimator 1370 and Noise Model Updating 1390. The Noise Model Matching, Noise Detection and Noise Model Updating sections of the INRRA method are ideally identical to the corresponding sections of the ARINA method that were described above in detail. Therefore, for the sake of brevity, a detailed description of these three sections will not be repeated here. However, following is a detailed description of the Inhalation Breath Definer 1350 and Parameter Estimator 1370 sections of the INRRA method 1300.

First, the Inhalation Breath Definer 1350 will be described. The purpose of section 1350 of the INRRA method 1300 is to characterize the inhalation noise based on at least one factor, for example, in this case based on a set of endpoints and a duration for one or more complete inhalation noise bursts which correspond with inhalation breaths. The decision from the Inhalation Noise Detection section 1330 is used to generate a preferably binary signal, $INM_m$, $m=0,1,2,\ldots,M-1$, in step 1352 that represents the presence or absence of inhalation noise as a function of time index m using values of ones and zeros. This binary signal is stored in a rotating buffer of length M samples, M being large enough to store enough samples of the binary signal to encompass the time period of at least two inhalation noise bursts, or breaths at the slowest expected breathing rate. In the preferred embodiment, this amounts to about 15 seconds. The time resolution of this binary signal and the value of M will be determined by the smallest sub-frame time used in the Inhalation Noise Detection section 1330, described previously, which depends on the Inhalation Noise Model Matching section, and is either 20 samples (2.5 msec) or 80 samples (10 msec), depending on which spectral matching method is used in step 1310.

Figure 16:
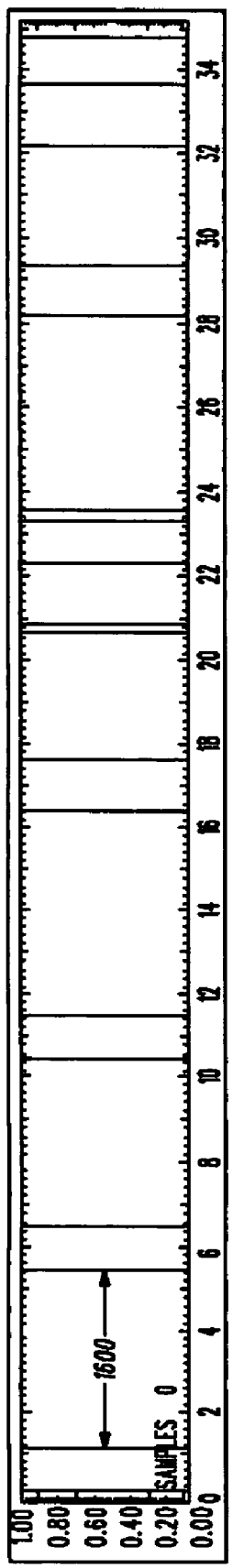
FIG. 16 illustrates the inhalation noise detector output signal as generated by the method illustrated in FIG. 13.
Figure 17:
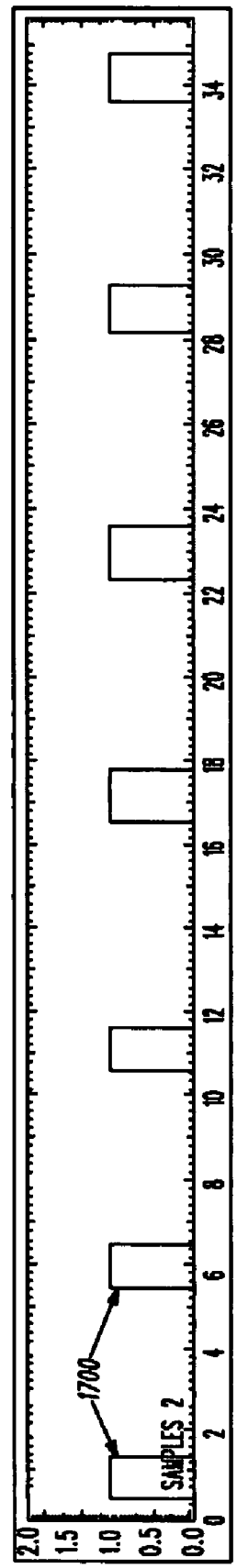
FIG. 17 illustrates the integrated inhalation detector output as generated by the method illustrated in FIG. 13.

Since the inhalation noise detector output from 1330 will not always be perfect, detection mistakes may occur during the detection of an inhalation noise causing some ambiguity as to the true start, and duration times of the noise. Thus, the binary inhalation noise signal generated by step 1352 is integrated using a well known moving-average type or other suitable filter at step 1354. This filter smoothes out any short duration detection mistakes and produces a more accurate signal that defines complete inhalation noise bursts, which correspond with respiratory breaths. From this signal generated at step 1354, at least one factor including accurate start time, $S_i$, end time, $E_i$, and breath duration time, $D_i$, for each noise burst may be determined within processing frame duration accuracy at step 1356. The start and end times of the inhalation noise bursts as represented by the binary signal $INM_m$, are obtained by noting their relative indices within the signal buffer. The duration $D_i$ is defined for a single inhalation noise burst as:

$$D_i = E_i - S_i, \quad i=0,1,2,\ldots,I_T, \qquad \text{EQ-14}$$

where i designates the ith of $I_T$ inhalation noise bursts present in the binary signal buffer of length M and time period T seconds. These inhalation noise burst factor values are ideally stored in a rotating, finite length buffer, one set of parameters per noise burst/breath. Some results of SCBA mask microphone speech processed by the INRRA algorithm sections 1310, 1330, 1352, and 1354 are shown in FIGS. 14–17, which are based on speech from a male speaker wearing an SCBA and recorded in a quiet room. FIG. 14 shows the input speech 1420 intermingled with noise bursts 1410. FIG. 15 shows a time-amplitude representation 1500 of the spectral distortion measure D output of Inhalation Noise Model Matching section 1310. FIG. 16 shows a time-amplitude representation 1600 of the binary output of the inhalation noise detector, 1330. FIG. 17 shows a time-amplitude representation 1700 of the output of the moving average filter component, 1354, of the breath definer algorithm 1350 that integrates the raw detector output and accurately defines the duration of each inhalation.

The Parameter Estimator 1370 section describes examples of parameters that may be estimated based on the characterization factors of the inhalation noise by the Inhalation Breath Definer section 1350. Two such examples of parameters that may be determined are the respiration rate of the user and the approximate inhalation air flow volume. Respiration rate may be easily determined using the sequential start time information, $S_i$, of successive inhalation noise bursts that may be determined in the Inhalation Breath Definer Section. For example, the "instantaneous" respiration rate per minute may be calculated as:

$$IRR = \frac{60}{(S_i - S_{i-1})}, \qquad \text{EQ-15}$$

where the $S_i$ are two successive noise bursts (inhalation breaths) start times in seconds. An average respiration rate may accordingly be calculated as:

$$RR = \frac{60 \, I_T}{\sum_{i=1}^{I_T} (S_i - S_{i-1})}, \qquad \text{EQ-16}$$

where $I_T$ is the number of detected consecutive breaths (inhalation noise bursts) in a specified time period T.

The approximate airflow volume during an inhalation breath may be estimated from the duration of the breath that may be determined by the Inhalation Breath Definer section, and from some additional information concerning the initial air tank fill pressure and the regulator average flow rate that may be determined off-line, for instance. When the intake valve is open, the air regulator admits a volume of air at nearly constant pressure to the facemask (a function of the ambient air/water pressure) as long as the air supply tank pressure remains above the minimal input pressure level for the air regulator. Moreover, the airflow rate into the mask is approximately constant while the mask regulator intake valve is open. The amount of air removed from the tank supply and delivered to the breather is thus proportional to the time that the intake valve is open. The time that the valve is open can be measured by the duration of each inhalation noise.

The initial quantity of air in the supply tank when filled is a function of the tank volume $V_0$, the fill pressure $P_0$, the gas temperature $T_0$, and the universal gas constant R, the mass of the gas in moles $N_m$, and can be calculated from the well-known ideal gas equation, $PV = N_m RT$. Since the initial fill pressure and tank cylinder volume may be known, and assuming the temperature of the tank gas and mask gas are the same, the volume of air available for breathing at the mask pressure may be given as:

$$V_M = \frac{P_0 V_0}{P_M}. \qquad \text{EQ-17}$$

The approximate volume of air delivered to the user during inhalation event i is then:

$$IV_i \approx K_R D_i, \qquad \text{EQ-18}$$

where $IV_i$ is the air volume, $D_i$ is the duration of the inhalation event as determined from the inhalation noise, and $K_R$ is a calibration factor related to the airflow rate for a particular air regulator. $K_R$ could be derived empirically for an individual system or perhaps determined from manufacturer's data. From the individual inhalation volumes, $IV_i$, the approximate total amount of air used up to a time T, $V_T$, may be defined as:

$$V_T \approx \sum_{i=1}^{I_T} IV_i, \qquad \text{EQ-19}$$

where $I_T$ is the total number of inhalations up to a time T. The remaining tank supply air is accordingly:

$$V_R \approx V_M - V_T. \qquad \text{EQ-20}$$

Some advantages of the INRRA method include that any microphone signal that picks up the breath noise over a minimal speech bandwidth can be used, and no special sensors are needed. Another advantage is that the respiration detector is based on detecting the noise produced by the air regulator which has stable spectral characteristics, and not human breath noises which are variable in character. Yet another advantage is that the respiration detector is not locked to examining specific frequencies as are other types of acoustic breath analyzers. Moreover, the system adapts automatically to changes in environment and to different users and pressurized air respirator mask systems. Thus, the INRRA method can provide continuously, instantaneous or average respiration rate and approximate air use volume data, which is valuable information that can be automatically sent outside of system 100, for example, via a radio data channel to a monitor. Those of ordinary skill in the art will realize that the above advantages were not meant to encompass all of the advantages associated with the INRRA embodiment of the present invention but only meant to serve as being representative thereof.

All three methods in accordance with the present invention (ARINA, AMSE and INRRA) are preferably implemented as software algorithms stored on a memory device (that would be included in a system in accordance with system 100 described above) and the steps of which implemented in a suitable processing device such as, for instance DSP 138 of system 100. The algorithms corresponding to the autocorrelation and LPC filtering methods of the present invention would likely take up the majority of the processor time. However, these algorithms or the entirety of the algorithms corresponding to the ARINA, AMSE and INRRA methods may, alternatively, be efficiently implemented in a small hardware footprint. Moreover, since the AMSE method uses many of the methodologies as the ARINA method, in another embodiment of the present invention, they may be efficiently combined.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. For example, although a method for identifying and attenuating inhalation noise was described above, the methodologies presented with respect to the present invention may be applied to other types of noise, such as exhalation noise or other types of noises with pseudo-stationary spectral characteristics lending themselves to efficient detection using the above methods. Thus, it should be understood that the invention is not limited by the foregoing description, but embraces all such alterations, modifications and variations in accordance with the spirit and scope of the appended claims.

What is claimed is:

1. A method for characterizing inhalation noise within a pressurized air delivery system, the method comprising the steps of:
   generating an inhalation noise model based on inhalation noise generated by a pressurized air delivery system, wherein the noise model is represented as a deterministic digital filter based at least on an autocorrelation sequence derived from at least one digitized sample of inhalation noise;
   receiving an input signal that includes inhalation noise comprising at least one inhalation noise burst;
   comparing the input signal to the noise model to obtain a similarity measure;
   comparing the similarity measure to at least one threshold to detect the at least one inhalation noise burst; and
   characterizing the at least one detected inhalation noise burst.

2. The method of claim 1 further comprising the step of determining at least one parameter based on the characterization.

3. The method of claim 2, wherein the at least one parameter includes at least one of respiration rate and inhalation air flow volume of a user.

4. The method of claim 2, wherein the detected inhalation noise burst is characterized by at least one factor including:
   a start time of the at least one detected inhalation noise burst;
   an end time of the at least one detected inhalation noise burst; and
   a duration time of the at least one detected inhalation noise burst, wherein the at least one parameter is determined as a function of at least one of the characterization factors.

5. The method of claim 1, wherein the detected inhalation noise burst is characterized as a binary signal.

6. The method of claim 5 further comprising the step of filtering the binary signal.

7. The method of claim 1, wherein the deterministic digital filter is a linear predictive coding (LPC) filter based on a set of LPC coefficients that are generated from a set of autocorrelation coefficients.

8. The method of claim 7, wherein the set of LPC coefficients are generated from the set of autocorrelation coefficients using a Durbin method.

9. The method of claim 7, wherein the step of generating the inhalation noise model comprises the steps of:
   sampling inhalation noise to generate the at least one digitized sample of the inhalation noise;
   determining the set of autocorrelation coefficients from the at least one digitized sample;
   generating the set of LPC coefficients based on the set of autocorrelation coefficients; and
   generating the LPC filter from the set of LPC coefficients.

10. The method of claim 9 further comprising the step of windowing the at least one digitized sample prior to determining the set of autocorrelation coefficients.

11. The method of claim 10, wherein the step of windowing is performed using a Hamming window.

12. The method of claim 1 further comprising the step of updating the noise model.

13. The method of claim 12, wherein the noise model is updated based on the at least one detected inhalation noise burst.

14. The method of claim 13, wherein the deterministic digital filter is a linear predictive coding (LPC) filter based on a set of LPC coefficients that are generated based on a first set of autocorrelation coefficients, the step of updating the noise model further comprising the steps of:
   sampling the at least one detected inhalation noise burst to generate at least one digitized sample of the at least one detected inhalation noise burst;
   determining a second set of autocorrelation coefficients from the at least one digitized sample of the at least one detected inhalation noise burst;
   updating the first set of autocorrelation coefficients as a function of the first and second sets of autocorrelation coefficients;
   updating the set of LPC coefficients based on the updated set of autocorrelation coefficients; and
   updating the LPC filter based on the updated set of LPC coefficients.

15. A device for characterizing inhalation noise within a pressurized air delivery system, comprising:
   a processing element; and
   a memory element coupled to the processing element for storing a computer program for instructing the processing device to perform the steps of:
   generating an inhalation noise model based on inhalation noise generated by a pressurized air delivery system, wherein the noise model is represented as a deterministic digital filter based at least on an autocorrelation sequence derived from at least one digitized sample of inhalation noise;
   receiving an input signal that includes inhalation noise comprising at least one inhalation noise burst;
   comparing the input signal to the noise model to obtain a similarity measure;
   comparing the similarity measure to at least one threshold to detect the at least one inhalation noise burst; and
   characterizing the at least one detected inhalation noise burst.

16. The device of claim 15, wherein the processing element is a digital signal processor.

17. A system for characterizing inhalation noise comprising:
   a pressurized air delivery system; and
   a communication system coupled to the pressurized air delivery system, the system comprising:
   generating an inhalation noise model based on inhalation noise generated by a pressurized air delivery system, wherein the noise model is represented as a deterministic digital filter based at least on an auto correlation sequence derived from at least one digitized sample of inhalation noise;

receiving an input signal that includes inhalation noise comprising at least one inhalation noise burst;

comparing the input signal to the noise model to obtain a similarity measure;

comparing the similarity measure to at least one threshold to detect the at least one inhalation noise burst; and characterizing the at least one detected inhalation noise burst.

* * * * *